(No Model.)
A. BUTTERFIELD.
APPARATUS FOR MARBLEIZING GLASS, PAPER, AND THE LIKE.
No. 471,288. Patented Mar. 22, 1892.
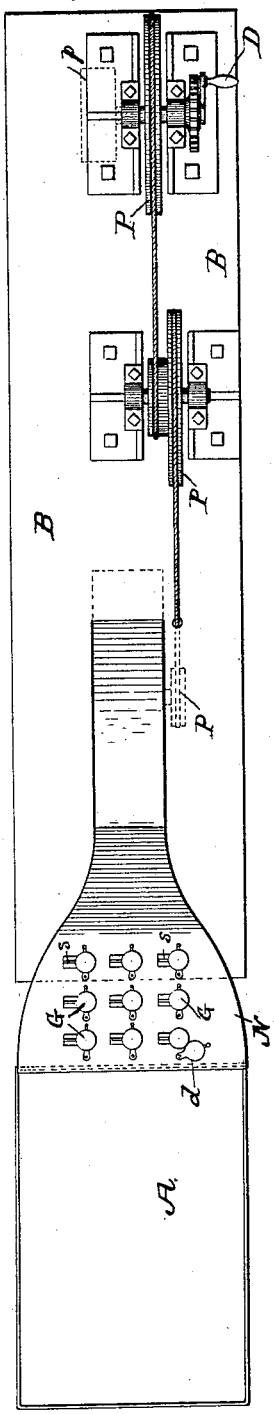
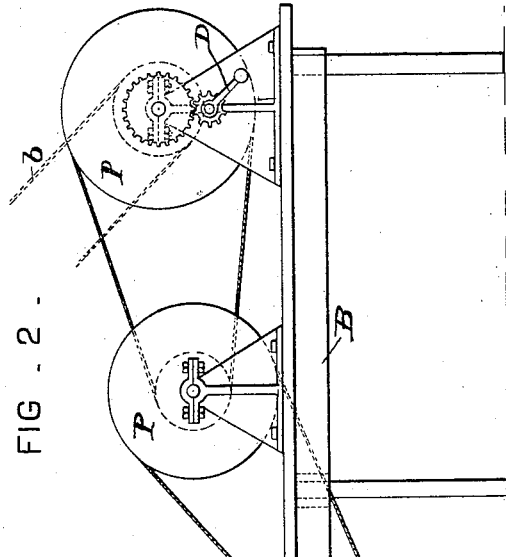
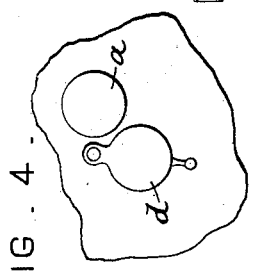
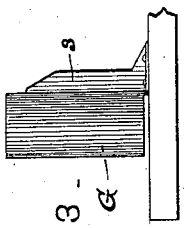
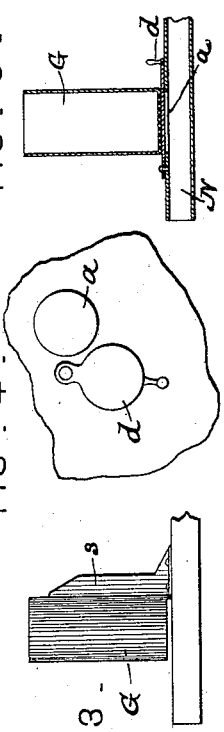
Attest: Geo. T. Smallwood.
J. A. Goldsborough
Inventor
Abraham Butterfield
By his attorney
F. H. Lowthorp
THE NORRIS PETERS CO., PHOTO-LITHO., WASHINGTON, D. C.

UNITED STATES PATENT OFFICE.

ABRAHAM BUTTERFIELD, OF TRENTON, NEW JERSEY, ASSIGNOR OF ONE-HALF TO WILLIAM C. ALPAUGH, OF SAME PLACE.

APPARATUS FOR MARBLEIZING GLASS, PAPER, AND THE LIKE.

SPECIFICATION forming part of Letters Patent No. 471,288, dated March 22, 1892.

Application filed March 7, 1891. Serial No. 384,075. (No model.)

*To all whom it may concern:*

Be it known that I, ABRAHAM BUTTERFIELD, a citizen of the United States, residing at Trenton, in the county of Mercer and State of New Jersey, have invented certain new and useful Improvements in Apparatus for Marbleizing Glass, Paper, and the Like; and I do hereby declare the following to be a full, clear, and exact description of the invention, such as will enable others skilled in the art to which it appertains to make and use the same.

This invention relates to the art of marbleizing glass, paper, and other substances, and has for its object to provide a new and improved apparatus for distributing or spreading the paints comprising the marbleizing film over the suface of the paint-supporting liquid in a manner better calculated to impart to the material being treated the mottled, veined, or streaked appearance desired.

With this object in view the invention consists in an apparatus such as hereinafter claimed, one specific form of which is illustrated in the drawings, and particularly described in this specification.

In the accompanying drawings, forming part of this specification, Figure 1 is a plan, and Fig. 2 a side elevation, of the entire apparatus. Figs. 3, 4, and 5 are details of the paint-holding receptacles.

In the drawings, A denotes a pan or shallow tank for containing the paint-holding liquid, the pan having suitable legs or other supports and made of any size required to give the film a superficial area sufficient for the purposes to which the invention is to be applied.

B is a long bench or table carrying the apparatus for distributing or spreading the paints upon the surface of the liquid in the pan, which apparatus comprises a fan-blower, a nozzle of peculiar construction, and means for driving the fan, which I will now proceed to describe.

C is a circular-fan casing of any approved design and construction. It is conveniently supported from the under side of the table, as shown, though it may be located and arranged in any preferred manner.

F denotes a rotary fan within the casing, which is driven by any convenient arrangement of speed-gearing from a hand-winch D, as shown by the pulleys P, or, instead of a hand-winch, a belt *b* may run from a pulley *p* to any power-driven shaft, it being immaterial to my invention how the fan is driven.

Connected with the discharge end of the fan-casing is the nozzle N, located upon the top of the table in the arrangement illustrated in the drawings and having its discharge end projecting and adapted to be arranged in close proximity to the edge of the pan A. This nozzle consists of a shallow casing flattened and widened toward its front end, as shown, and having in its upper wall apertures *a*, through which paint is allowed to fall into the interior of the nozzle, whence it is blown out of the mouth and scattered upon the surface of the liquid by the blast from the fan F. Over each one of the apertures *a* is located a suitable paint-receptacle G, supported upon the top of the nozzle by means of brackets or stands *s*. These paint-receptacles are provided with perforated bottoms, as shown in Fig. 5, and valves *d* are fixed upon the top of the casing and adapted to slide under the paint-receptacles and close the perforations in their bottoms and at the same time to cover tightly the apertures *a*.

My invention is not restricted to the use of any particular kind, construction, or arrangement of paint-receptacles or to any form or detail of valves. I have found a compact and convenient form of valve to be that shown in the drawings, consisting of a circular plate pivoted upon the casing and having a knob or handle by which it is turned, so as to open or close the perforations in the bottom of the paint-holders and the top wall of the nozzle-casing.

The construction being as thus described, the operation will be readily understood by those skilled in the art to be briefly as follows: Mixed paints being placed in the paint-receptacles G and the pan A being filled with a suitable paint-holding liquid, the air-blast from the fan F will blow the paint as it dribbles through the perforations in the bottoms of the paint-pots to the interior of the nozzle out upon the liquid in the pan A, producing a film or layer upon the surface of the liquid, having a streaked, veined, and mottled appearance. The paper, glass, or other material to be marbleized is then held in contact with this film until the paint adheres thereto in a manner well understood.

I have found by experiment that better results are obtained by using for the paint-holding liquid water which is impregnated with lime, to which a little alum is added in order to neutralize the effect of the lime upon the paint.

In using the above-described apparatus I prefer to mix the white paint with turpentine or other liquefying agent without the use of boiled oil and with but a small quantity of raw oil. I mix the colored paints as follows: to two pounds of paint, one-half a pint of raw and one-half a pint of boiled linseed-oil, thinned with one-half pint of turpentine. In mixing the white paint I use the same amount of raw oil, but omit entirely the boiled oil, and use three-fourths of a pint of turpentine to the same quantity of paint. These proportions I find very satisfactory. I prefer to scatter the white paint upon the liquid after the colors have been spread thereon.

The particular form of apparatus shown and described in this specification, I wish it understood, is only one of many forms of apparatus in which the invention may be embodied, and I would have it understood that so far as my apparatus claims are concerned it is not my purpose to have them restricted to the details of construction shown in the present drawings.

Having thus described my invention, what I claim is—

1. In a machine for marbleizing glass, paper, and the like, the combination, with a pan or tank for holding the paint-supporting liquid, of a paint scattering or distributing apparatus consisting of a blower, a nozzle arranged between the pan and the blower, with its delivery end in proximity to the edge of the pan, and a receptacle for holding paint, arranged above the nozzle and constructed to allow the paint to pass down into the nozzle to be blown by the air-blast onto the liquid in the pan.

2. In an apparatus for marbleizing glass, paper, and the like, a nozzle for use in scattering or sprinkling paint upon the surface of the paint-holding liquid by means of a blast of air, said nozzle provided with paint-carrying receptacles having valve-controlled apertures through which the paint may be allowed to pass down into the nozzle to be acted upon by the blast.

3. In an apparatus for marbleizing glass, paper, and the like, an air-blast nozzle for use in scattering or sprinkling paint upon the surface of the paint-holding liquid, said nozzle consisting of a body portion having openings in its top and carrying paint-receptacles supported above the openings, said receptacles having valve-controlled apertures through which the paint may be allowed to pass down into the nozzle, one end of said nozzle being adapted for connection to an air-blast apparatus and the opposite end terminating in a narrow mouth.

4. A machine for marbleizing glass, paper, and the like, consisting of a pan or shallow tank for holding the paint-supporting liquid, a blast apparatus, a nozzle connected at one end with the blower and having its delivery end in proximity to the edge of the pan, paint-receptacles mounted upon the top of the nozzle and having apertures in their bottoms communicating with the interior of the nozzle, valves for opening and closing the apertures, and means for operating the blower, substantially as described.

In testimony whereof I affix my signature in presence of two witnesses.

ABRAHAM BUTTERFIELD.

Witnesses:
L. SCHOONOVER,
F. C. LOWTHORP.